United States Patent [19]
Stewart

[11] 3,840,703
[45] Oct. 8, 1974

[54] AUTOMATIC DISCONNECT CIRCUIT FOR REDUCING DIAL PULSE DISTORTION AND NOISE IN A SUBSCRIBER CARRIER TELEPHONE SYSTEM

[75] Inventor: James A. Stewart, Menlo Park, Calif.

[73] Assignee: GTE Automatic Electric Laboratories Incorporated, Northlake, Ill.

[22] Filed: Feb. 5, 1973

[21] Appl. No.: 329,802

Related U.S. Application Data

[63] Continuation-in-part of Ser. No. 230,704, March 1, 1972, Pat. No. 3,780,228.

[52] U.S. Cl. .......................... 179/2.5 R, 179/16 AA
[51] Int. Cl. .............................................. H04h 1/08
[58] Field of Search .......... 179/2.5 R, 16 A, 16 AA, 179/16 F, 26 R

[56] References Cited

UNITED STATES PATENTS

| | | | |
|---|---|---|---|
| 2,829,204 | 4/1958 | Dimond | 179/26 |
| 3,459,895 | 8/1969 | Ebhardt | 179/2.5 R |
| 3,510,584 | 5/1970 | Krasin et al. | 179/2.5 R |
| 3,601,538 | 8/1971 | May et al. | 179/2.5 R |
| 3,624,300 | 11/1971 | Krasin et al. | 179/2.5 R |
| 3,639,692 | 2/1972 | Krasin et al. | 179/2.5 R |

*Primary Examiner*—Kathleen H. Claffy
*Assistant Examiner*—Randall P. Myers
*Attorney, Agent, or Firm*—Leonard R. Cool; Russel A. Cannon; T. C. Jay, Jr.

[57] ABSTRACT

A local subscriber carrier battery is connected through a battery charging circuit, a disconnect circuit, and a cable pair of a central office talking battery. The disconnect circuit includes: a pair of transistor switches that are connected in series between associated lines of the cable pair and the charging circuit for selectively blocking line current to the latter during ringing of a physical subscriber handset and when the latter is off-hook or is dialing; a first resistor-capacitor network and transistor for detecting initiation of a dial pulse; and a second resistor-capacitor network including a Zener diode and transistor for controlling the operation of the switches. The second network is responsive to operation of the first network for holding the switches open to prevent charging current flowing on the cable pair for at least a prescribed time interval after detection of the leading edge of a dial pulse. This ensures that the contacts of the A-pulsing relay in the central office drop out in response to the dial pulse.

31 Claims, 6 Drawing Figures

AUTOMATIC DISCONNECT CIRCUIT FOR REDUCING DIAL PULSE DISTORTION AND NOISE IN A SUBSCRIBER CARRIER TELEPHONE SYSTEM

REFERENCE TO PRIOR APPLICATION

This is a continuation-in-part application of Ser. No. 230,704, filed Mar. 1, 1972, U.S. Pat. No. 3,780,228, issued Dec. 18, 1973.

BACKGROUND OF THE INVENTION

This invention relates to subscriber-carrier telephone communication systems and more particularly to circuitry for reducing dial pulse distortion, noise on the physical subscriber channel, and noise in the subscriber carrier channel when power from a central office talking battery is used to charge a local battery in a self-contained subscriber carrier terminal that is at a location remote from the central office.

The durations of the break and make periods associated with each dial pulse interval are nominally 58 milliseconds and 42 milliseconds (i.e. 58 percent break and 42 percent make), respectively. Dial pulse distortion is a measure of the difference between the time duration of a dial pulse and the time duration of the corresponding current pulse delivered by the A-pulsing relay in the central office. It is expressed as the difference between percent break of a physical subscriber's dial contacts and the percent break of the responding A-relay contacts.

A simplified schematic block diagram of a typical subscriber-carrier telephone system is illustrated in FIG. 1 if the disconnect circuit 4 is omitted. Such a system includes a circuit 5 for charging a local subscriber battery 6 from a central office talking battery 8 on lines 9 and 10 of a cable pair. The coil windings 12A and 12B of the A-pulsing relay 11 in a line selector of the central office are connected in series with the talking battery 8. The local battery 6 powers the subscriber-carrier equipment including transmitting and receiving circuitry in circuit 7 which is connected to a subscriber-carrier handset 15 comprising dial contacts 16, hook-switch contacts 17, and a ringer 18 having an associated leakage impedance represented by resistor 19. A physical subscriber handset 23 comprising dial contacts 24, hook-switch contacts 25, and a ringer 26 having an associated leakage impedance represented by resistor 27 is connected through low-pass filter 13 and lines 29 and 30 to the cable pair lines 9 and 10, respectively. Each additional physical pair subscriber handset 23' (not shown) that is connected across the extensions 9B and 10B of the lines adds a leakage impedance in shunt with the resistor 27, and the net leakage impedance across the cable pair 9, 10 decreases.

The direct current (dc) resistance of cable pair 9, 10 between the central office and subscriber carrier terminal 7 should be greater than, or equal to, one-half the dc resistance of the cable pair 9, 10 between the central office and the voice frequency (VF) drop 31, 32 for a physical subscriber handset 23, that is farthest from the central office. This ensures that the local battery charging circuit 5 is disconnected from lines 9, 10 when any physical subscriber handset 23 is off-hook. This operation prevents connection at lines 9A, 10A of a voice frequency termination, that is in the subscriber carrier terminal, during the physical channel off-hook condition. Such a connection would attenuate the voice frequency signal on the physical channel. Since the line loss from the central office to the farthest physical subscriber's drop already attenuates the voice signal significantly, the addition of a midspan termination loss, caused by a subscriber carrier terminal, is undesirable.

The time required for the A-pulsing relay contacts 14 in such a telephone system to open in response to a dial pulse from a physical subscriber handset at time $t_1$ (see FIGS. 2 and 3) is a function of the leakage impedance across the lines of the cable pair, as well as the minimum continuous line current from the talking battery 8. This is because a finite time is required to dissipate energy stored in the central office coil windings 12A and 12B so that the contacts 14 thereof can open. The rate of decay of line current caused by the collapsing magnetic field on the windings 12A and 12B decreases as the net leakage impedance across lines 9 and 10 decreases. Thus, the time for the magnetic field on coil windings 12A and 12B to collapse and for the associated contacts 14 to open in response to a dial pulse increases as the number of physical pair subscriber handsets (i.e., the number of physical pair leakage paths 27 across lines 9 and 10) is increased. The effective value of the net leakage impedance across the physical pair also decreases to cause an increase in the time required for the A-relay contacts 14 to open when a continuous current is drawn from the lines 9 and 10 to charge local battery 6. Since drawing a charging current from lines 9, 10 and adding physical pair ringers to these lines both decrease the net leakage impedance across the cable pair, the maximum number of physical pair ringers must be reduced when a subscriber carrier battery charging circuit is employed.

Dial pulse distortion is graphically illustrated by the curve in FIG. 2 which represents the voltage across the cable pair as the physical subscriber handset 23 goes off-hook and dials the number 2, and by the curves in FIG. 3 which represent line current in the A-pulsing relay coil windings 12A and 12B. Referring now to the solid curves in FIGS. 2 and 3 and considering that there is no battery charging current or other leakage current on the cable pair when the physical subscriber handset 23 goes off-hook at time $t_0$, the magnitude of the voltage across its hook-switch contacts 25 drops and a current flows on lines 9 and 10 to energize the A-relay 11 and close its contacts 14. When the number 2 is dialed and the physical subscriber dial contacts 24 open at time $t_1$, decay of the magnetic field on coil windings 12A and 12B produces a transient voltage 28 in FIG. 2 having a value that is much greater than the 48 volt talking battery voltage in order to maintain the same current flowing in the windings 12A and 12B. The induced voltage at a time $t_1^+$ is that voltage that is necessary to maintain in the external circuit the same current as was flowing at a time $t_1^-$. Since energy is the product of power and time, and power is the product of voltage and current, and since the current decay is exponential, it is seen that the higher the induced voltage the shorter the time required to dissipate the energy stored in the magnetic field.

As this magnetic field collapses at time $t_1$, the line current decays exponentially to 0 milliampere (as indicated by the solid curve 20 in FIG. 3) through the leakage impedances 27 of the physical ringers. When the line current (curve 20) falls below the 6 milliampere drop-out value of relay 11 at time $t_2$, the contacts 14 thereof open in response to the break period 21 of the first dial pulse interval. In contrast, if a subscriber battery charging current of 4 milliamperes is drawn from lines 9 and 10, the line current at time $t_1$ decays to 4 milliamperes as represented by the dashed curve 22 rather than to 0 milliampere as in curve 20, see FIG. 3. The line current in this case does not fall below the 6 milliampere drop-out value for the A-relay 11 until a later time $t_3$. This means that the 4 milliampere subscriber-battery charging current drawn from lines 9, 10 delays the opening of the contacts 14 by the time interval $t_3 - t_2$. This decrease in the duration of the dial pulse 21 is an example of dial pulse distortion. It is desirable to reduce this dial pulse distortion as much as possible.

The circuit 5 for charging local battery 6 may be one of those described in copending application entitled, "Battery Charging Circuit for Subscriber Carrier Equipment" by Neale A. Zellmer, application Serial No. 230,619, filed Mar. 1, 1972 Pat. No. 3,777,247, issued Dec. 4, 1973, and assigned to the assignee of this invention. The charging circuits disclosed in this copending case provide dc continuity between one input and one output (to battery 6) terminal, the latter being a local power reference terminal. These circuits comprise an inductor for storing energy and a switching transistor for alternately blocking and passing a current from lines 9, 10 of the cable pair through the inductor to charge local battery 6. In practice, the switching transistor may open and close at a rate such that it appears like a pulse generator having a pulse repetition frequency of approximately 100 kHz. The object of the battery charger circuit is to convert the high line voltage, low line current (e.g. 40 volts and 3.5 milliamperes) on lines 9, 10 into a low charging voltage, high charging current (e.g. 7 volts and 14 milliamperes) from the output terminals of circuit 5. In a subscriber carrier system employing such a charging circuit 5, the ringing signal on lines 9, 10 for the physical subscriber handset 23 may cause a noise signal to be generated in this charging circuit 5 and coupled to the subscriber carrier handset 15. It is desirable to prevent the generation of such a noise signal in the subscriber carrier handset.

In certain applications where the subscriber carrier and physical VF drops 1, 2 and 31, 32, respectively, are located in the same cable sheath, the subscriber carrier ringing signal on the associated VF drop 1, 2 is capacitively coupled onto the VF drop 31, 32 and back to the input of the subscriber carrier terminal and charging circuit. Such a signal on the physical VF drop 31, 32 is called a longitudinal voltage. If this voltage is coupled back to the input reference terminal of charging circuit 5, a noise signal is produced in the physical subscriber handset 23. It is desirable that disconnect circuit 4 break the continuity between lines 9, 10 and the reference input of circuit 5 for such a longitudinal voltage to reduce the noise in the physical subscriber handset 23.

An object of this invention is the provision of an improved disconnect circuit in a subscriber-carrier telephone system which lincludes a circuit for charging a local subscriber-carrier battery from the cable pair and central office talking battery.

SUMMARY OF THE INVENTION

In accordance with this invention, noise in a subscriber carrier handset caused by a ringing signal to a physical subscriber handset and dial pulse distortion caused by a subscriber carrier terminal having a local battery that is charged through a cable pair from the central office talking battery are reduced by automatically disconnecting the local battery charging circuit from the talking battery during ringing of the physical subscriber handset, and at the start of the off-hook to on-hook transition of a dial pulse from the physical subscriber handset and keeping it disconnected for a time interval that is greater than the duration of the voltage transient at the start of the dial pulse and the time interval required for the A-pulsing relay to open.

BRIEF DESCRIPTION OF THE DRAWINGS

This invention will be more fully understood from the following detailed description thereof together with the following drawings in which:

FIGS. 1, 2, and 3 having been previously referred to in describing the background of this invention;

DESCRIPTION OF PREFERRED EMBODIMENTS

Figure 1:
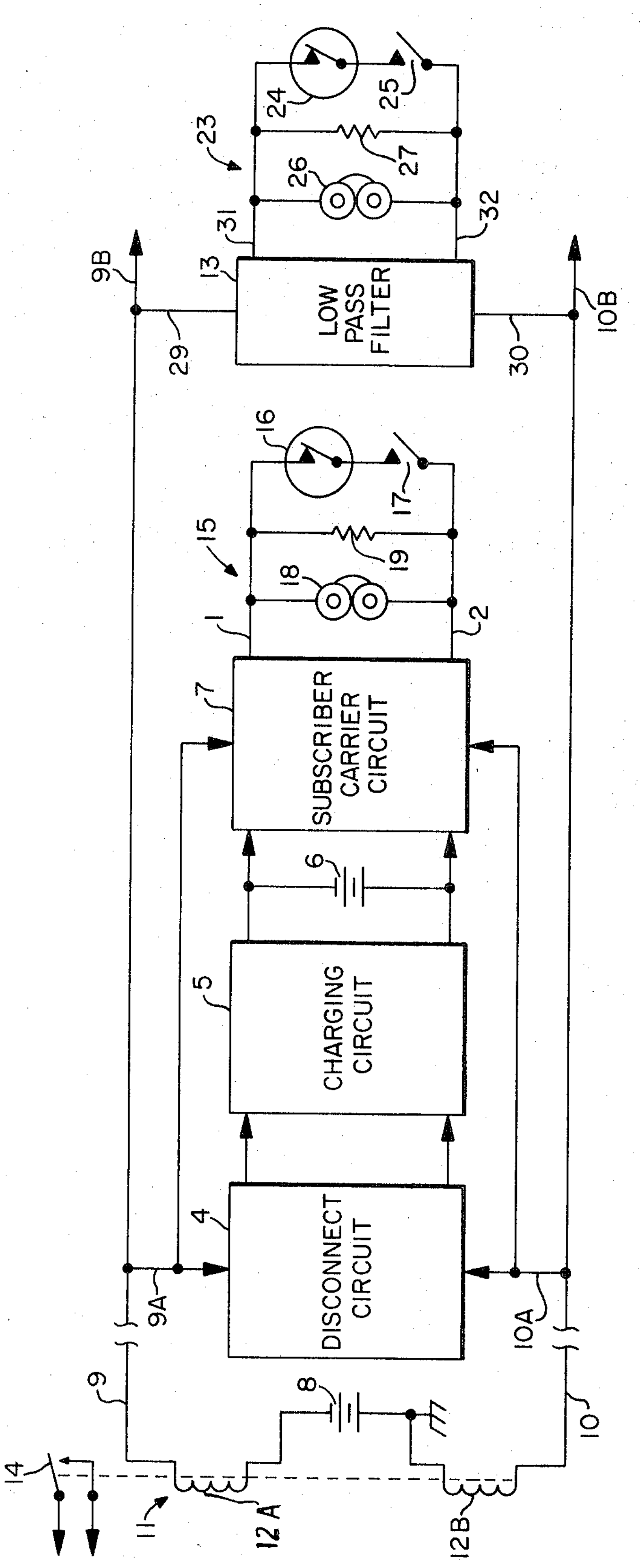
FIG. 1 is a schematic diagram of portions of a telephone system embodying this invention.

Referring now to FIG. 1, a telephone system embodying this invention includes central office and subscriber carrier equipment. The central office equipment includes a talking battery 8, an A-pulsing relay 11 having coil windings 12A and 12B and contacts 14, and a cable pair comprising lines 9 and 10. The subscriber carrier equipment includes disconnect circuit 4, circuit 5 for charging the local battery 6, subscriber carrier circuit 7 including transmitting and receiving circuitry, and a subscriber carrier handset 15. The physical pair subscriber handset 23 comprises the ringer 26 and the series combination of dial contacts 24 and hook-switch contacts 25 connected across the cable pair. The leakage path presented across the cable pair lines 9 and 10 by the physical ringer 26 is represented by the resistor 27.

In practice, the A-relay, which is pulsed by the physical channel dial contacts 24, is located in a line selector and is connected to talking battery 8 through a line finder (not shown). The A-relay coil windings 12A and 12B are directly connected to talking battery 8 in FIG. 1 for convenience of illustration. The lines 9 and 10 of the cable pair are connected to disconnect circuit 4 through associated lines 9A and 10A. Line 10 and the positive terminal of the talking battery 8 are grounded. Other physical subscriber handsets 23 (not shown) may be connected to the cable pair extensions 9B and 10B.

As stated previously, charging circuit 5 may provide dc continuity between one input and one output terminal and thereby a local reference potential connected to one of its input terminals. Circuit 5 may comprise a series switching transistor that opens and closes at a rate such that it appears like a pulse generator having a pulse repetition frequency such as 100 kHz. The object of the battery charger circuit 5 is to convert the high line voltage, low line current into low charging voltage, high charging current at the circuit 5 output port, e.g. from 40 volts and 3.5 milliamperes on lines 9A, 10A to 7 volts and 14 milliamperes from circuit 5.

Figure 4:
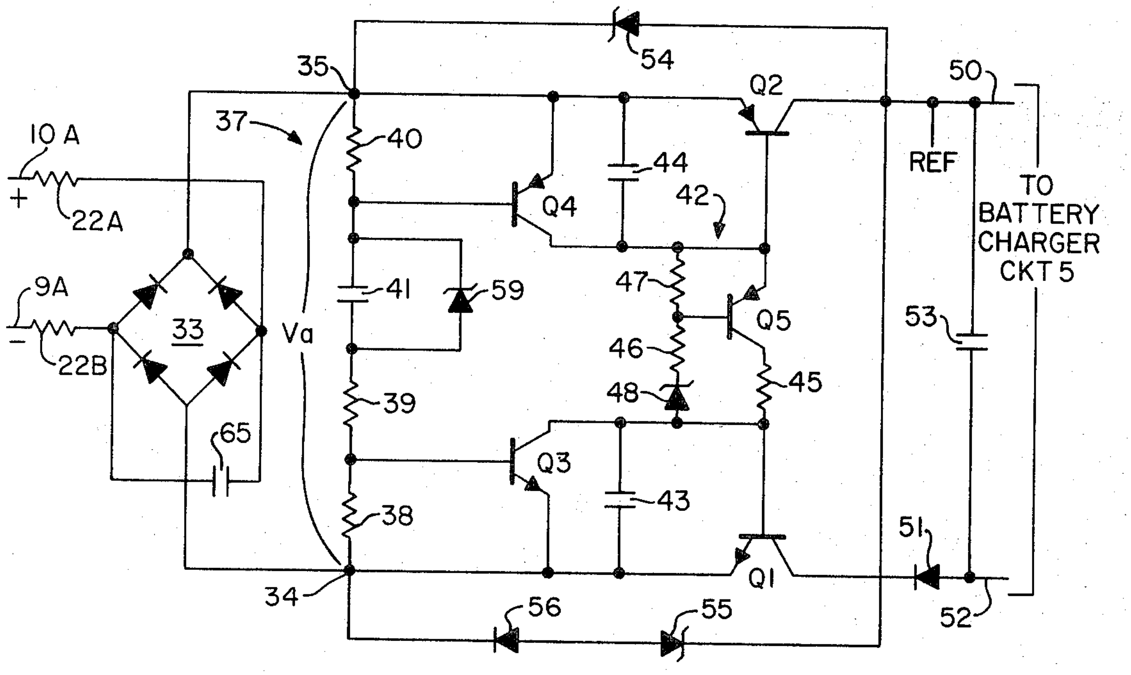
FIG. 4 is a detailed schematic diagram of one embodiment of a disconnect circuit in accordance with this invention.

Referring now to FIG. 4, a disconnect circuit embodying this invention comprises: a diode bridge circuit 33; a first RC network 37 including resistors 38, 39, and 40 and capacitor 41 which are connected in series across the output terminals 34 and 35 of bridge 33; a second RC network 42 that is connected across the terminals 34 and 35 and including capacitors 43 and 44, and resistors 45, 46, and 47; a pair of transistor switches Q1 and Q2; a pair of transistors Q3 and Q4 for detecting transient pulse signals; and a control transistor Q5 having Zener diode 48 connected across the collector-base junction thereof. The switches Q1 and Q2 have opposite conduction characteristics as do Q3 and Q4. The transistor pairs Q1, Q3 and Q2, Q4, however, have the same conduction characteristics. Q5 is shown as a PNP transistor having the same conduction characteristics as Q2 and Q4. Alternatively, Q5 may be an NPN transistor with its emitter electrode connected to the Q1 base electrode, resistor 45 connected between its collector and the Q2 base electrode, and Zener diode 48 connected across its collector-base junction. The elements Q1 – Q5, inclusive, in this example are silicone transistors having 0.6 volt base-emitter turn-on voltages.

Figure 6:
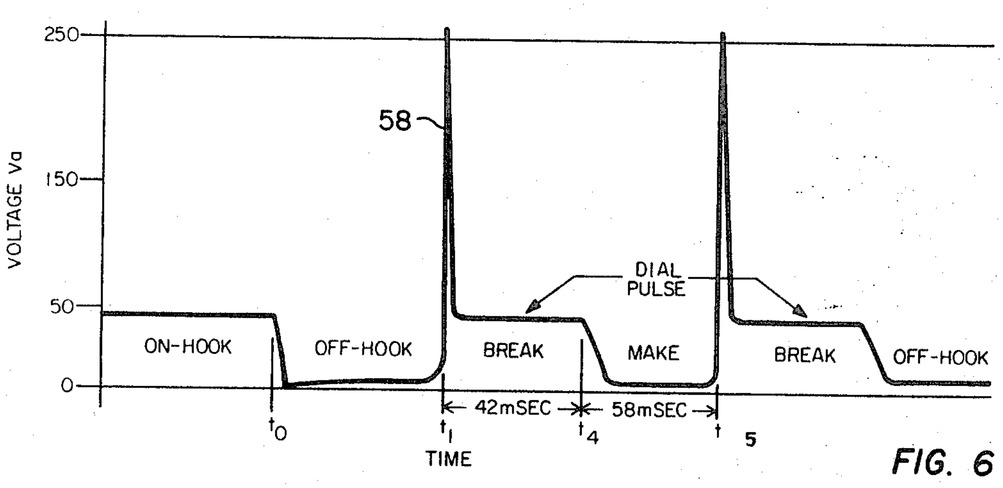
FIG. 6 is a curve representing the applied voltage $V_a$ in the disconnect circuits in FIGS. 4 and 5, the transient voltage 58 occurring on initiation of a dial pulse by the physical subscriber's handset.
Figure 5:
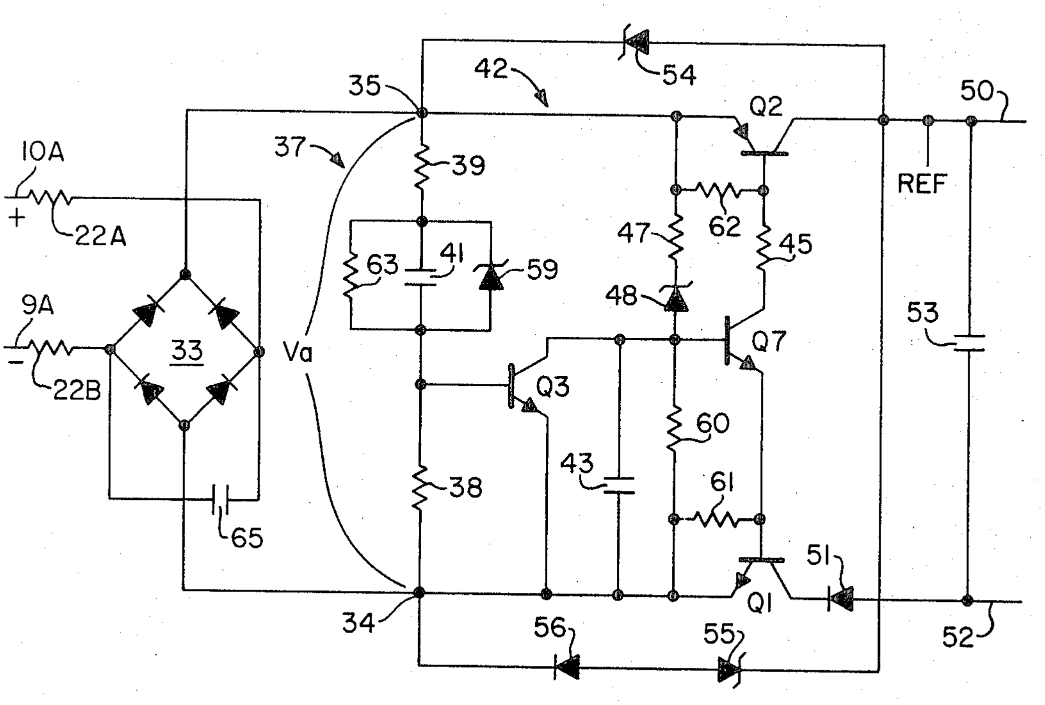
FIG. 5 is a detailed schematic diagram of a preferred embodiment of a disconnect circuit in accordance with this invention.

Bridge circuit 33 is connected through resistors 22A and 22B to the cable pair 9, 10 and thus to talking battery 8, and through Q1 and Q2 to charging circuit 5. The resistors 22A and 22B ensure line balance at voice and carrier frequencies and limit currents induced by lightening surges. The bridge ensures that local battery 6 is connected to cable pair 9, 10 with the correct polarity regardless of the polarity of the talking battery voltage on lines 9, 10. The voltage produced by bridge 33 is the applied voltage $V_a$ between points 34 and 35, which is shown in FIGS. 4 – 6.

Transistors Q1 and Q2 are switches that isolate the charging circuit 5 from the central office talking battery 8 when base drive current is removed threfrom. Capacitors 43 and 44 are connected across the base-emitter junctions of Q1 and Q2, and the emitter-collector junctions of Q3 and Q4, respectively. The base electrodes of the switches Q1 and Q2 are connected in series through the control transistor Q5 emitter-collector junction and current-limiting resistor 45, as well as through the bias circuit for Q5 which comprises control diode 48 and the resistors 46 and 47, the latter determining the base drive current to Q5. Diode 48 is a Zener diode having a breakdown voltage of 24 volts.

The collector electrode of Q2 is directly connected to the disconnect circuit output terminal 50 which is connected to the local power reference input terminal of charging circuit 5. The collector electrode of Q1, however, is connected through junction diode 51 to the other output terminal 52 of the disconnect circuit. Capacitor 53 is connected across the output terminals 50, 52 to provide a low impedance source and low-pass filter for the charging circuit 5. A Zener diode 54 is connected between the local power reference output terminal 50 and point 35. A Zener diode 55 and junction diode 56 are connected in series between the same output terminal 50 and point 34. The Zener diodes 54 and 55 are connected in the reverse directions to terminal 50 and have breakdown voltages of 100 volts to protect the transistors of the disconnect circuit from voltage surges such as are caused by lightening. The diodes 51 and 56 isolate the lines 9, 10 from reference terminal 50 when a longitudinal voltage appears on the former lines 9, 10 such as by a ringing signal on the subscriber carrier VF drop 1, 2 as is described more fully hereinafter.

When the voltage $V_a$ is greater than approximately 25 volts, e.g., when the physical subscriber handset 23 is on-hook prior to time $t_0$ in FIG. 4, Zener diode 48 breaks down to bias Q5 into saturation to charge capacitors 43 and 44. If the voltages on capacitors 43 and 44 exceed approximately 0.6 volt during conduction of diode 48 and Q5, the switches Q1 and Q2 are driven into saturation to pass a current from the central office battery 8 to charge capacitor 53 and to circuit 5 for charging local battery 6. The time constant of the second RC network 42 is selected to be large, in the order of 1.8 seconds, to ensure that switches Q1 and Q2 are maintained cut off during the 100 millisecond dialing period, as is described more fully hereinafter. The breakdown voltage of diode 48 is selected to cut off this diode and Q5, and thus switches Q1 and Q2, when the applied voltage $V_a$ falls below approximately 25 volts when the physical subscriber handset 23 goes off-hook at time $t_0$.

The emitter-collector junctions of Q3 and Q4 are also connected across associated capacitors 43 and 44. Resistors 38 and 40 are connected across the base-emitter junctions of associated ones of these transistors. The resistors 38, 39, and 40 and Zener diode 59 determine the voltage $V_a$ at which disconnect occurs under steady state over-voltage. Capacitor 41 acts like a short circuit during transients such as the off-hook to on-hook transient voltage 58 produced by the physical handset 23 at time $t_1$ in FIG. 5. Control transistors Q3 and Q4 are selectively caused to conduct in response to the voltage 58 when the voltages across associated resistors 38 and 40 exceed their base-emitter conduction potentials to detect initiation of a dial pulse. Conduction of these transistors discharges capacitors 43 and 44 to hold Q1 and Q2 cut off for a time interval that is greater than that required to open the A-pulsing relay 11 in the central office.

In order to detect a ringing voltage on lines 9, 10 for the physical subscriber handset, a 47 volt Zener diode 59 is connected across capacitor 41. This ciode limits the capacitor voltage to this level. The diode 59 is needed since the full-wave rectified voltage $V_a$ in response to such a ringing voltage on lines 9, 10 may have a rise time that is long compared to the time constant of capacitor 41 and will be followed by the latter. When the voltage $V_a$ exceeds the diode 59 breakdown voltage, this diode bypasses capacitor 41. The resultant voltages produced across resistors 38 and 40 cause Q3 and Q4 to conduct to cut off the switches Q1 and Q2 and disconnect charging circuit 5 from lines 9 and 10. Capacitor 65 is a lowpass filter that aids in blocking the high frequency noise generated in circuit 5 from the lines 9, 10 so that it will not affect the carrier channel receiver.

The circuit of FIG. 4 is designed to connect charging circuit 5 to lines 9, 10 when the physical subscriber handset 23 is on-hook for a long time period that is greater than the 100 millisecond dial pulse interval (this enables circuit 5 to charge local battery 6 from the talking battery 8 over lines 9, 10); to disconnect circuit 5 from lines 9, 10 when the magnitude of the line voltage (i) is less than approximately 25 volts which corresponds to the physical subscriber handset 23 being off-hook (this prevents capacitor 53 loading lines 9, 10 and increasing loss to VF signals in the physical channel), (ii) is greater than approximately 60 volts which corresponds to a ringing voltage that is applied to the physical subscriber handset 23 (this prevents the physical channel ringing voltage on lines 9, 10 coupling noise through circuit 5 and into the subscriber carrier handset 15), and (iii) is an increasing transient voltage of greater than approximately 10 volts such as is produced during the off-hook to on-hook transition at time $t_1$ when the physical subscriber handset 23 is dialing (this reduces dial pulse distortion); and to provide discontinuous dc paths in circuit 4 between lines 9, 10 and the local power reference output terminal 50 (this prevents the subscriber carrier subset's VF ringing signal producing a noise signal in the physical subscriber handset 23 when the latter is off-hook).

The operation of disconnect circuit 4 will now be described.

Figure 2:
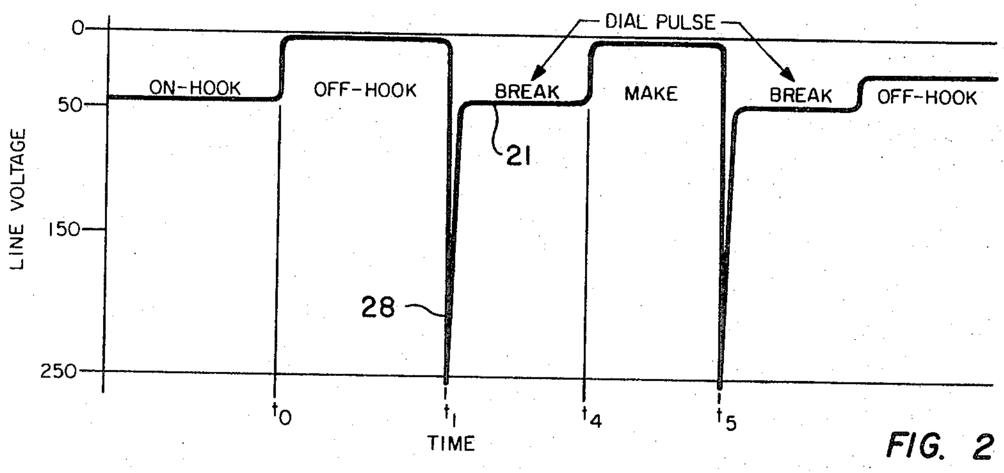
FIG. 2 is a curve representing the voltage across a cable pair as a physical subscriber handset goes off-hook and the number 2 is dialed.
Figure 3:
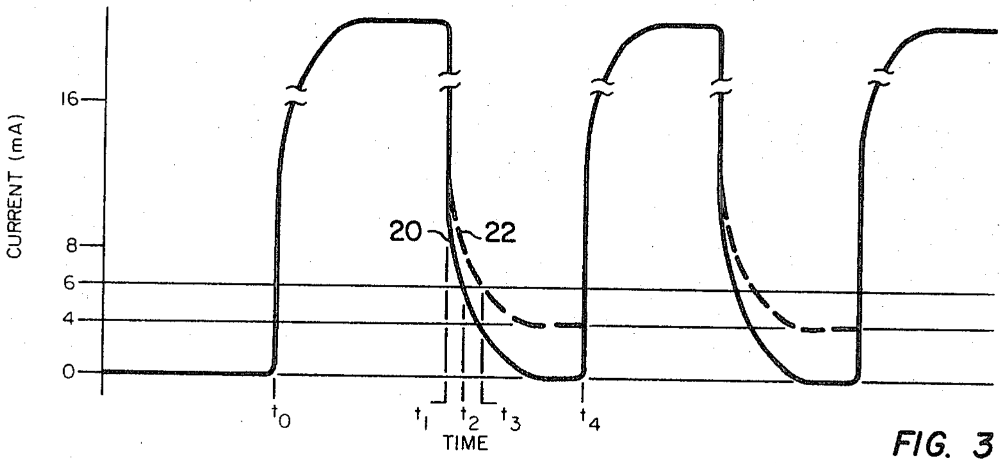
FIG. 3 is curves 20 and 22 representing the line current in the A-pulsing relay coil windings of a line selector in a central office for leakage currents on the cable pair of 0 and 4 milliamperes, respectively.

When the physical subscriber handsets 23 are on-hook prior to time $t_0$ in FIGS. 2 and 6, capacitor 41 is charged to 47 volts by the voltage $V_a$, Q3 and Q4 and diode 59 are cut off, diode 48 and Q5 are conducting, capacitors 43 and 44 are charged to approximately 0.7 volts which is the base-emitter potential of Q1 and Q2, and switches Q1 and Q2 are saturated to pass a current to circuit 5 for charging the local battery 6.

When a physical subscriber handset 23 goes off-hook at time $t_0$ in order to dial the number 2, for example, the magnitude of the line voltage drops to something less than 25 volts, e.g., 5 volts. The 47 volts stored on capacitor 41 reverse biases and cuts off the diodes of bridge 33 and this capacitor rapidly discharges through switches Q1 and Q2 and network 37. Q1 and Q2 continue to conduct in saturation since the voltages developed across resistors 38 and 40 are not sufficient to bias Q3 and Q4 into conduction to discharge associated capacitors 43 and 44. When the voltage on capacitor 41 decreases to approximately 25 volts, diode 48 is cut off to bias Q5 into cutoff. This opens the base circuit of switches Q1 and Q2. Capacitors 43 and 44, however, continue to provide a base drive to the associated switches as the former discharge through the Q1 and Q2 base-emitter junctions. Capacitor 41 continues to discharge through Q1 and Q2 during this time interval. When the voltages across capacitors 43 and 44 drop below 0.6 volts, the switching transistors are also cut off to disconnect circuit 5 from lines 9A and 10A. Capacitors 41, 43, and 44 may continue to discharge to new equilibrium voltages through their leakage paths. Capacitor 53 discharges by supplying current to circuit 5 to establish a new equilibrium voltage that is below the new line voltage by an amount that is dependent on the current drain of charge circuit 5. If Q1 and Q2 were to remain in saturation with handset 23 off-hook, capacitor 53 would connect the resistors 22A and 22B, which may for example be a 1,000 ohm termination, across the line. This would cause a net 3 dB loss to VF signals transmitted in the physical channel. The aforementioned operation of circuit 4 prevents such a degradation of service on the physical channel.

Release of the dial in the physical subscriber handset 23 at time $t_1$ opens the dial contacts 24 and the transient voltage 58 appears across points 34 and 35. In practice, the transient voltage 58 may have a magnitude of hundreds of volts and a duration of approximately 5 milliseconds. Since capacitor 41 cannot charge instantaneously, the voltage spike 58 forces a current through this capacitor and resistors 38, 39, and 40. The voltage developed across resistors 38 and 40 drives Q3 and Q4 into conduction to dump any charge on associated capacitors 43 and 44 and thus to clamp the voltages thereon to approximately 0.2 volt, which is the Q3 and Q4 emitter-collector potentials. Since the voltages across capacitors 43 and 44 are less than the 0.6 volt base-emitter turn-on potentials of Q1 and Q2, the switches are maintained cut off. When the voltage $V_a$ exceeds approximately 25 volts, diode 48 breaks down and drives Q5 into conduction. Capacitor 41 charges throughout the transient voltage 58 to maintain Q3 and Q4 conducting (and thus Q1 and Q2 cut off) until the voltage developed across this capacitor 41 exceeds approximately 37 volts, in approximately 10 milliseconds.

With Q3 and Q4 cut off (as are Q1 and Q2) and a voltage $V_a$ of approximately 47 volts, capacitors 43 and 44 charge through Q5 and diode 48 from 0.2 volt toward 22 volts. When the voltages on each capacitor reach 0.6 volt, Q1 and Q2 will conduct. Since the time constant of capacitors 43 and 44 and resistors 45 and 47 is selected to be large (approximately 1.8 seconds), however, approximately 60 milliseconds is required for these capacitors 43 and 44 to charge sufficiently to drive Q1 and Q2 into saturation. This time interval is greater than the duration of the break portion of the dial pulse period. Thus, the switching transistors Q1 and Q2 are maintained cut off throughout the dial pulse break period between times $t_1$ and $t_4$. When switches Q1 and Q2 cut off, capacitor 53 discharges through the battery charger until its voltage drops to the battery 6 voltage. This operation reduces dial pulse distortion to enable the A-pulsing relay contacts in the central office to rapidly open in response to the physical subscriber dial pulse.

When the magnitude of the line voltage again decreases to approximately 5 volts during the make period of the dial pulse (see FIGS. 2 and 6, time $t_4 - t_5$), the voltage $V_a$ is still approximately 47 volts due to the charge on capacitor 41 which cuts off the diodes of bridge 33. Capacitor 41 discharges through capacitors 43 and 44 and the diode 48 and Q5 paths until the voltage on capacitor 41 is less than approximately 25 volts. At this time, diode 48 is cut off to cut off Q5 and open the base drive current path for switches Q1 and Q2. The time constant associated with the discharge path of capacitor 41 is approximately 12 milliseconds, which is greater than the time interval required for capacitor 41 to discharge sufficiently to cut off diode 48 and Q5. Since this time interval is not long enough for the capacitors 43 and 44 to charge sufficiently to bias Q1 and Q2 into conduction, these transistor switches are maintained cut off throughout the dial pulse interval (time $t_1$ to $t_5$ ) initiated by the physical subscriber handset 23 and while that handset is off-hook. Capacitors 41, 43, and 44 continue to discharge to new equilibrium voltages through their leakage paths while all of the transistors Q1 – Q5 are cut off during the remainder of the make period of a dial pulse interval. This operation is repeated during the next dial pulse interval.

When a ringing signal is applied to the physical subscriber handset 23, the voltage on lines 9A and 10A is a low frequency (e.g., 20 Hz) signal superimposed on the 48 volt talking battery voltage. This 100 volt low frequency ringing voltage causes diode 59 to conduct to bypass capacitor 41. The resultant current through resistors 38 and 40 causes Q3 and Q4 to conduct to dump the charge on capacitors 43 and 44 to cut off the switches Q1 and Q2. This operation diconnects charging circuit 5 from lines 9A, 10A during this ringing pulse and prevents a noise signal being coupled through circuit 5 to the subscriber carrier handset 15.

If the carrier and physical subscriber VF drops 1, 2 and 31, 32, respectively, are in the same cable sheath, the carrier channel VF ringing voltage may be capacitively coupled as a longitudinal signal onto the physical VF drop 31, 32 and back through lines 9, 10 to the input of circuit 4. If a continuous path exists through circuit 4 to the power reference terminal 50, a noise signal is produced in the physical subscriber handset 23 when the latter is off-hook. The diodes 51 and 56 are employed to prevent conduction paths through either diode 48 or the base-collector junction diode of Q5, and then either through the Q1 base-collector junction diode and charging circuit 5 or through the Q1 base-emitter junction diode and Zener diode 55 to the local power reference on output terminal 50. In a circuit employing the diodes 51 and 56 that was built and tested, a 20 dB reduction in noise was obtained in the physical subscriber handset 23.

In an embodiment of this invention that was built and tested the duration of the transient voltage 58 was measured to be approximately 5 milliseconds, the time constant associated with the charge path of capacitor 41 was approximately 9 milliseconds, the time constant associated with the discharge path of capacitor 41 was approximately 12 milliseconds, and the time constant associated with capacitors 43 and 44 was approximately 1.8 seconds. In this circuit, the value of capacitor 41 was 0.05 $\mu$farad, whereas the values of capacitors 43 and 44 were both 47 $\mu$farads. Measurement at the central office showed a reduction in dial pulse distortion from 20 percent to less than 4 percent when this invention was employed. A reduction in noise on the carrier channel of approximately 30 dB (from 44 dBrnc to 13 dBrnc) was also obtained during ringing of the physical handset.

The preferred embodiment of this invention in FIG. 5 is similar to the circuit in FIG. 4, corresponding elements being designated by the same reference characters. The principal differences in the FIG. 5 circuit are that: Q4 and capacitor 44 are omitted; capacitor 43 is connected to the base electrode of Q7, which is an NPN transistor as are Q1 and Q3; diode 48 is connected through resistors 47 and 60 to the emitter electrodes of Q2 and Q1, respectively; resistors 61 and 62 are connected across the base-emitter junctions of associated switches Q1 and Q2; and a resistor 63 is connected across capacitor 41. Q7 is an NPN transistor since such a device is more economical, particularly for transistors having high collector-to-emitter breakdown voltages. Alternatively, Q7 may be an PNP transistor if Q4 and capacitor 44 are employed instead of Q3 and capacitor 43 as is shown in FIG. 5, and diode 48 is moved to remain electrically connected across the Q7 base-collection junction. In this circuit, Q7 and the switches Q1 and Q2 are essentially cut off over the same time intervals.

Resistor 60 has a large resistance and is employed with bias resistor 47 to connect diode 48 to points 34, 35 in order to provide a path for the leakage current of this diode 48 to flow without turning on Q7. The resistor 62 is employed to render the circuit less sensitive to noise spikes and to provide a path for the $i_{co}$ leakage current of Q7 without turning Q2 on. The resistor 61 serves a similar purpose and provides a symmetrical circuit. Resistor 63 has a very large resistance and is shunted across capacitor 41 to provide a leakage path to discharge the latter more rapidly when diode 48 is cut off. It should be noted that since capacitor 43 is connected across the series combination of the base-emitter junctions of both Q1 and Q7, the charge voltage on this capacitor must reach 1.2 volts before Q1 and Q2 can turn on. This greatly increases the time interval that Q1 and Q2 are cut off following dialing on the physical channel.

The operation of the disconnect circuit in FIG. 5 is similar to that of the circuit in FIG. 4, except that whereas Q5 can conduct when Q1 and Q2 are cut off, the transistor Q7 is cut off whenever the switches Q1 and Q2 are nonconducting. Referring now to FIG. 5, when the physical subscriber handsets 23 are on-hook prior to time $t_0$ in FIGS. 2 and 6, capacitor 41 is charged to approximately 47 volts by the voltage $V_a$, Q3 and diode 59 are cut off, diode 48 is conducting, and capacitor 43 is charged to approximately 1.4 volts which biases Q7 into conduction and Q1 and Q2 into saturation to pass a current to circuit 5 for charging local battery 6. When a physical subscriber handset 23 goes off-hook at time $t_0$ in order to dial the number 2, for example, the magnitude of the line voltage drops to approximately 5 volts which cuts off diode bridge 33. Capacitor 41 rapidly discharges through switches Q1 and Q2 and network 37. When the voltage on capacitor 42 decreases to approximately 24 volts, diode 48 is cut off. Capacitor 43 discharges through resistor 60 and through the Q7 base-emitter junction and resistor 61 and the Q1 base-emitter junction. When the voltage on capacitor 43 drops below 1.2 volts, Q1 is rendered nonconducting to cut off Q7 and thus Q2 to disconnect circuit 5 from lines 9A and 10A. Capacitor 42 continues to discharge through resitor 63.

Upon release of the dial in the physical subscriber handset at time $t_1$, the transient voltage 58 appears across points 34 and 35. This voltage spike 58 forces a current through capacitor 41 and resistor 38 to bias Q3 into conduction to dump any charge on capacitor 43 and thus to clamp the capacitor voltage to approximately 0.2 volt. Although diode 48 conducts when the voltage $V_a$ exceeds approximately 26 volts, Q7 remains cut off since the voltage on capacitor 43 is less than the junction voltages of Q1 and Q7. When the charge on capacitor 41 exceeds approximately 37 volts, Q3 is cut off and capacitor 43 charges toward 22 volts. If the capacitor 43 voltage exceeds 1.2 volts, Q7, Q1, and Q2 will conduct. Since the time interval required to charge capacitor 43 to this level is greater than the duration of the break period between time $t_1$ and $t_4$, however, Q7, Q1 and Q2 remain cut off throughout the dial pulse intervals produced by a physical subscriber handset 23.

If a ringing signal is applied on lines 9 and 10 to the physical subscriber handset 23 when the latter is on-hook prior to time $t_0$, the approximately 100 volts ringing voltage breaks down Zener diode 59 to bypass capacitor 41. The resultant voltage on resistor 38 biases Q3 into conduction to dump the charge voltage on capacitor 43 to cut off Q7 and Q1, and thus Q2. Since the charge time associated with capacitor 43 and conduction of Q1 and Q7 is greater than the time interval between rectified ringing voltage pulses across points 34 and 35, Q7 and the switching transistors Q1 and Q2 remain cut off throughout application of the ringing voltage to the physical subscriber handset.

What is claimed is:

1. Apparatus for automatically disconnecting a local subscriber carrier battery charging circuit that is connected, in a subscriber carrier telephone system including a physical subscriber subset and a carrier subscriber subset, through a cable pair to a central office power source from the latter during the off-hook conditions produced on the cable pair by the physical subscriber subset, said apparatus comprising

- a pair of input terminals for connection to associated lines of a cable pair;
- a pair of output terminals for connection to associated input terminals of the charging circuit;
- first means for selectively connecting said output terminals to associated input terminals for connecting the charging circuit through said apparatus to the power source;
- second means for detecting an off-hook condition produced on the cable pair by a physical subscriber subset;
- third means responsive to operation of said second-detecting means for opening said first-connecting means to disconnect the charging circuit from the central office power source;
- said first-connecting means comprising a first transistor having collector and emitter electrodes electrically connected in series between one input and one output terminal, and having a base electrode electrically connected to said third means; and fourth means connecting the other input and other output terminals thereof, said first transistor being conducting to connect and cut off to disconnect the charging circuit and the power source; and
- said second-detecting means comprising a Zener diode that is electrically connected across said input terminals, said diode conducting when the voltage applied thereto in response to a line voltage is greater than the Zener breakdown voltage thereof and being cut off when this applied voltage is less than the Zener voltage thereof;
- said third means being responsive to nonconduction of said diode for driving said first transistor into cutoff to disconnect said 0ne input and one output terminals.

2. Apparatus according to claim 1 wherein said diode is connected across the input terminals through said third means, the latter comprising a capacitor connected in series with said diode and said input terminals.

3. Apparatus according to claim 2 wherein said third means comprises a second transistor having collector and emitter electrodes electrically connected between said first transistor base electrode and said fourth-connecting means, and having a base electrode; said Zener diode being electrically connected across said second transistor collector-base junction.

4. Apparatus for automatically disconnecting a local subscriber carrier battery charging circuit that is connected, in a subscriber carrier telephone system including a physical subscriber subset and a carrier subscriber subset, through a cable pair to a central office power source from the latter throughout the off-hook and dial conditions produced on the cable pair by the physical subscriber subset for reducing dial pulse distortion, said apparatus comprising

- a pair of input terminals for connection to associated lines of a cable pair;
- a pair of output terminals for connection to associated input terminals of the charging circuit;
- first means for selectively connecting said output terminals to associated input terminals for connecting the charging circuit through said apparatus to the power source;
- second means for detecting an off-hook condition produced on the cable pair by a physical subscriber subset;
- third means responsive to operation of said second-detecting means for opening said first-connecting means to disconnect the charging circuit from the central office power source; and
- fourth means for detecting a transient voltage occurring on the cable pair on initiation of a dial pulse in the physical subscriber subset;
- said third means being responsive to operation of said fourth-detecting means for holding open said first means at the start of a dial pulse for a time interval that is greater than the duration of the break portion of a dial pulse.

5. Apparatus according to claim 4 wherein said first means comprises a first transistor having collector and emitter electrodes connected in series between one input and one output terminal thereof, and having a base electrode electrically connected to said third means; and fifth means electrically connecting said other input and output terminals thereof, said first transistor being conducting to connect and cut off to disconnect the one input and one output terminals thereof; and wherein said fourth-detecting means comprises a first capacitor and first resistor electrically connected in series across said input terminals, and a second transistor having a base-emitter junction connected across said first resistor and having a collector electrode electrically connected to said third means, said second transistor conducting in response to a voltage developed across said first resistor in response to the transient voltage produced across the input terminals on initiation of a dial pulse by the physical subscriber subset.

6. Apparatus according to claim 5 wherein said third means comprises a second capacitor electrically connected across the collector-emitter junction of said second transistor, conduction of the latter-second transistor discharging said second capacitor for holding said first transistor cut off.

7. Apparatus according to claim 6 wherein said second capacitor is electrically connected across the base-emitter junction of said first transistor, said second capacitor having a charge time for charging to the first transistor base-emitter turn-on junction voltage that is greater than the duration of the break portion of a dial pulse for holding said first transistor cut off and thus disconnecting said one input and one output terminals throughout the break portion of a dial pulse.

8. Apparatus according to claim 7 wherein said third means comprises a third transistor having collector-emitter electrodes resistively electrically connected between said first transistor base electrode and said fifth-connecting means and having a base electrode; wherein said second-detecting means comprises a Zener diode; and including sixth-connecting means resistively electrically connecting said diode in series between the terminal of said second capacitor that is spaced from the one input terminal and the other input terminal and also resistively connecting said diode across the base-collector junction of said third transistor; said diode being conducting when the voltage applied thereto in response to a line voltage is greater than the Zener voltage thereof and being cut off when this line voltage is less than the Zener voltage thereof, nonconduction of said diode cuasing said third transistor to cut off and said second capacitor to discharge to drive said first transistor into cut-off to disconnect the one input and one output terminals thereof.

9. Apparatus according to claim 5 for disconnecting the input and output terminals thereof and thus the charging circuit from the power source when a ringing voltage to the physical subscriber subset is applied on the cable pair, said apparatus including a Zener diode electrically connected across said first capacitor.

10. Apparatus according to claim 5 including a diode connected in the reverse direction between said first transistor and said one output terminal.

11. Apparatus according to claim 8 wherein said fifth connecting means comprises a fourth transistor having emitter-collector electrodes connected in series between the other input and other output terminals and having a base electrode connected in series with said third transistor emitter and collector electrodes.

12. Apparatus according to claim 5 including a second resistor connected across said first capacitor and providing a leakage path for discharging the latter during the time interval that said first transistor is nonconducting.

13. Apparatus according to claim 6 wherein said third means comprises a third transistor having emitter and collector electrodes resistively electrically connected in series between said first transistor base electrode and said fifth-connecting means, and having a base electrode electrically connected to the terminal of said second capacitor that is spaced from said one input terminal, said second capacitor being electrically connected across the base-emitter junctions of said first and third transistors which are electrically connected in series.

14. Apparatus according to claim 13 wherein said second capacitor has a charge time for charging to the sum of the base-emitter junction turn-on voltages of said first and third transistors that is greater than the duration of the break portion of a dial pulse for holding said first transistor cut off throughout the break portion of a dial pulse.

15. Apparatus according to claim 14 wherein said second means comprises a first Zener diode and sixth means resistively electrically connecting said first diode in series between said input terminals and across the base-collector junction of said third transistor.

16. Apparatus according to claim 15 wherein said fifth means comprises a fourth transistor having emitter and collector electrodes electrically connected in series between said other input and other output terminals and having a base electrode electrically connected in series with the emitter and collector electrodes of said third transistor.

17. Apparatus according to claim 16 including a second-leakage resistor connected across the base-emitter junction of said fourth transistor.

18. Apparatus according to claim 17 including a third resistor connected across said first capacitor and providing a leakage path for discharging the latter during nonconduction of said first transistor.

19. Apparatus according to claim 17 for disconnecting said input and output terminals and thus the charging circuit from the power source during application of a ringing voltage on the cable pair to the physical subscriber subset for reducing noise in a subscriber carrier subset, said apparatus including a second Zener diode electrically connected across said first capacitor.

20. Apparatus according to claim 19 including a third semiconductor diode connected in the reverse direction between the one of said first and fourth transistors having the third transistor collector electrode connected thereto and the associated output terminal.

21. A two-port network for disconnecting, upon initiation of a dial pulse by a physical subscriber subset in a subscriber carrier telephone system that also includes a carrier subscriber subset, a local subscriber carrier battery charging circuit that is connected to the output port thereof from a cable pair and central office talking battery that are connected in series to the input port thereof for reducing dial pulse distortion, said network comprising a first-switching transistor having an emitter electrode electrically connected to one terminal of the input port, having a collector electrode electrically connected to one terminal of the output port, and having a base electrode;

a second transistor having an emitter electrode connected to said one input terminal and having base and collector electrodes;

first-connecting means electrically connecting the other terminals of the input and output ports together;

a first capacitor connected across the emitter-collector junction of said second transistor and the emitter-base junction of said first transistor;

a first resistor;

a second capacitor;

second-connecting means connecting said first resistor and said second capacitor in series across the input port with said first resistor connected across the base-emitter junction of said second transistor;

a third transistor having collector and emitter electrodes electrically connected in series between said first transistor base electrode and said first-connecting means, and having a base electrode; and third-connecting means resistively electrically connecting the terminal of said first capacitor that is spaced away from the one input terminal to the base electrode of said third transistor and to the other imput terminal; said first capacitor having a charge time for charging to the first-switching transistor base-emitter junction turn-on voltage that is greater than the time interval required for the central office A-pulsing relay contacts to open;

said first-switching transistor and said third transistor conducting to pass a charging current from the central office talking battery prior to the physical subscriber telephone subset producing a dial pulse;

said second transistor conducting in response to a voltage produced across said first resistor and caused by a transient voltage across the input terminals on the leading edge of a dial pulse to discharge said first capacitor to cut off said first-switching transistor and disconnect the input and output ports for a time interval that is greater than that required for the central office A-pulsing relay contacts to open.

22. A network according to claim 21 that is symmetrical wherein said first-connecting means comprises a fourth transistor having emitter and collector electrodes electrically connected to the other input and other output terminals, respectively, and having a base electrode electrically connected to one of said third transistor emitter and collector electrodes;

wherein said second-connecting means comprises a second resistor connected to the other input terminal and in series with said first resistor and second capacitor;

including a fifth transistor having an emitter-base junction connected across said second resistor with the emitter electrode connected to the other input terminal, and having a collector electrode; and wherein said third-connecting means comprises a third capacitor connected across said fifth transistor emitter-collector junction and said fourth transistor emitter-base junction.

23. The network according to claim 22 including a third resistor connected in parallel with said second capacitor for providing a discharge path for the latter during nonconduction of said first and fourth-switching transistors.

24. A network according to claim 22 for disconnecting the input and output terminals throughout the off-hook and dialing conditions produced on the cable pair by the physical subscriber subset, wherein said third-connecting means comprises a first Zener diode electrically connected between said first and third capacitor and across the base-collector junction of said third transistor, said first diode being rendered nonconducting for cutting off said third transistor and thus said first and fourth-switching transistors when the line voltage applied thereto drops below the first diode Zener voltage in response to the physical subscriber subset going off-hook.

25. The network according to claim 24 for disconnecting the input and output terminals thereof in response to a ringing voltage applied on the cable pair to the physical subscriber subset, wherein said second-connecting means comprises a second Zener diode connected across said second capacitor, said second diode conducting when the line voltage applied thereto exceeds its Zener voltage for rendering said second and fifth transistors conducting to discharge the associated first and third capacitors for rendering said first and fourth-switching transistors nonconducting.

26. Apparatus according to claim 25 including a third semiconductor diode connected in the reverse direction between the one of said first and fourth transistor collector electrodes having the third transistor collector electrode connected thereto and the associated output terminal.

27. A two-port network for disconnecting, upon initiation of a dial pulse by a physical subscriber subset in a telephone system that also includes a carrier suscriber subset, a local subscriber carrier battery charging circuit that is connected to the output port thereof from a cable pair and central office talking battery that are connected in series to the input port thereof for reducing dial pulse distortion, said network comprising first and second switching transistors having emitter electrodes electrically connected to different terminals of the input port, having collector electrodes electrically connected to different terminals of the output port, and having base electrodes;

a third transistor having an emitter electrode connected to the one input terminal that is connected to said first transistor emitter electrode, and having base and collector electrodes;

a first capacitor connected across the emitter-collector junction of said third transistor and the emitter-base junction of said first transistor;

a first resistor;

a second capacitor;

first-connecting means connecting said first resistor and second capacitor in series across the input port with said first resistor connected across the base-emitter junction of said third transistor;

a fourth transistor having emitter and collector electrodes electrically connected in series between said first and second transistor base electrodes, and having a base electrode; and second-connecting means resistively electrically connecting the terminal of said first capacitor that is spaced away from the one input terminal to the other input terminal and to the base electrode of said fourth transistor;

said first capacitor having a charge time for charging to the sum of the first and fourth transistor base-emitter junction turn-on voltages that is greater than the time interval required for the central office A-pulsing relay contacts to open; said first and second-switching transistors and said fourth transistor conducting to pass a charging current from the central office talking battery prior to the physical subscriber telephone subset producing a dial pulse; said third transistor conducting in response to a voltage produced across said first resistor and caused by a transient voltage across the input terminal on the leading edge of a dial pulse to discharge said first capacitor to cut off said first and second-switching transistors and disconnect the input and output ports for a time interval that is greater than that required for the central office A-pulsing relay contacts to open.

28. Apparatus according to claim 27 including a second resistor connected in parallel with said second capacitor for providing a discharge path for the latter during nonconduction of said first and second-switching transistors.

29. Apparatus according to claim 27 for disconnecting the input and output terminals throughout the off-hook and dialing conditions produced on the cable pair by the physical subscriber subset, wherein said second-connecting means comprises a first Zener diode electrically connected across the base-collector junction of said fourth transistor, said first diode being rendered nonconducting for discharging said first capacitor and cutting off said first and fourth transistors and thus said second transistor when the line voltage applied thereto drops below its Zener voltage in response to the physical subscriber subset going off-hook; said first capacitor having a charge time for charging to the sum of the first and fourth transistor base-emitter junction turn-on voltages that is greater than the duration of the break portion of a dial pulse.

30. Apparatus according to claim 29 for disconnecting the input and output terminals thereof in response to a ringing voltage applied on the cable pair so the physical subscriber subset, wherein said first-connecting means includes a second Zener diode connected across said second capacitor, said second diode conducting when the line voltage applied thereto exceeds the Zener voltage thereof for rendering said third transistor conducting to discharge said first capacitor for rendering said first and second-switching transistors nonconducting.

31. Apparatus according to claim 30 including a third semiconductor diode connected in the reverse direction between the one of said first and second transistor collector electrodes having the fourth transistor collector electrode connected thereto and the associated output terminal.

* * * * *